Figure 1:
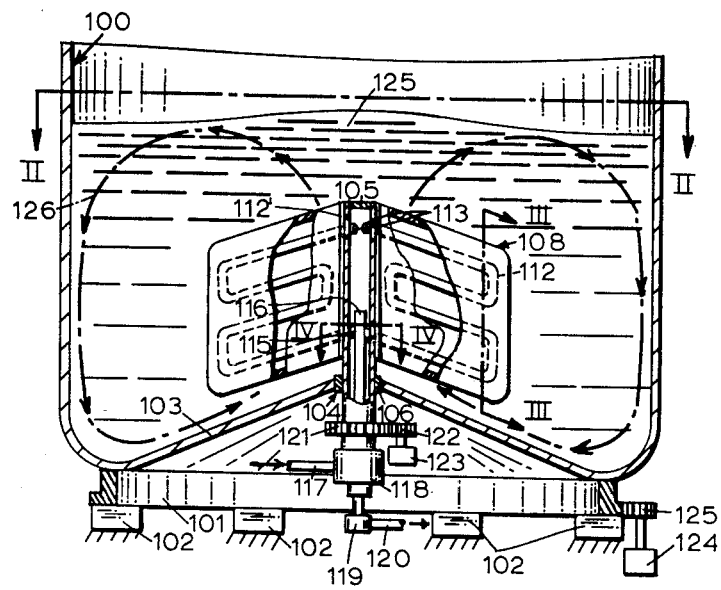

Feb. 2, 1965  W. SPIELVOGEL  3,168,431
BREWING VESSELS AND THE LIKE
Filed Aug. 4, 1961  3 Sheets-Sheet 1

WALTER SPIELVOGEL
*INVENTOR.*

BY Karl F. Ross

AGENT

Feb. 2, 1965 W. SPIELVOGEL 3,168,431
BREWING VESSELS AND THE LIKE
Filed Aug. 4, 1961 3 Sheets-Sheet 3

WALTER SPIELVOGEL
*INVENTOR.*

BY Karl F. Ross

AGENT

United States Patent Office
3,168,431
Patented Feb. 2, 1965

3,168,431
BREWING VESSELS AND THE LIKE
Walter Spielvogel, Essen-Bredeney, Germany, assignor to Weigelwerk G.m.b.H., Essen, Germany, a corporation of Germany
Filed Aug. 4, 1961, Ser. No. 129,409
Claims priority, application Germany, Aug. 8, 1960, W 28,342
3 Claims. (Cl. 159—37)

My present invention relates to brewing pans and, more particularly, to kettles, pans and like receptacles for concentrating fermentative liquids by evaporation.

Frequently in the production of fermented liquids such as beer, the basic liquor (e.g. the malt and/or hop infusion generally referred to as "wort") must be concentrated, a step usually effected by boiling down the liquor, thereby evaporating water therefrom. Such evaporation of water from, for example, beer wort has been carried out heretofore in concentrating pans or kettles, often termed "brewing coops," provided with heating means effective along the floor of the receptacle for bringing the wort to the proper evaporation temperature. The hitherto-known concentrating pans were, accordingly, provided with bottom heating means, e.g. double bottoms, wherein a heating fluid such as steam was circulated. These pans, however, were of only limited efficiency and did not permit high evaporation rates; moreover, since the heat was concentrated along the floor of the pan, the wort tended to foam over its entire surface and often boiled over, thereby limiting further the effectiveness of the evaporation process.

It is, therefore, an object of the present invention to provide an improved kettle for concentrating fermentative liquors by evaporation at relatively high rates.

A more specific object of the invention is to provide a receptacle of the character referred to having heating means capable of effecting the transfer of heat to the contents of the receptacle with improved efficiency.

These objects are realized, according to the invention, by providing an evaporation receptacle with at least one upstanding plate-like heating element disposed at substantially the geometric center or central zone of the receptacle, thereby concentrating the heat in this zone to promote convection currents of the wort flowing from this zone toward the walls of the kettle, thus maintaining a circulation which effectively prevents the foaming or boiling over of the wort along these walls. Moreover, the plate-like configuration of the heating elements permits the planar surfaces thereof to be in continuous contact with the circulating wort and results in a high rate of heat transfer from the elements to the wort.

Advantageously, the heating elements lie in substantially vertical planes and have one or more heat-transfer surfaces substantially parallel to the axis of the receptacle or lying in an axial plane thereof. In generally cylindrical or rather axially symmetrical brewing kettles, a plurality of such heating elements are, preferably, arranged in a star-shaped array, e.g. disposed radially in an angularly equispaced configuration about a central distributor carrying the heating fluid so that the heat transferred to the wort is of greater intensity in the region of the axis, i.e. the region of juncture between the heating elements. According to a more particular feature of the invention, the kettle may be of elongated (e.g. elliptical) transverse cross-section, in which case a longitudinally extending heating element is disposed centrally within the kettle. Advantageously, the heating element extends in the direction of the major dimension of the transverse cross-section, e.g. parallel to or coincidental with the major axis of the ellipse.

While the plate-like heating elements may be formed with electric-heating means (e.g. an array of resistance wire), I prefer to utilize a heating fluid such as steam which is circulated through the heating plates. The latter may be formed with a plurality of parallel pipes for conducting the heating fluid or may be constructed with two spaced-apart parallel plates defining a flattened heating chamber through which the fluid is passed. According to a more particular feature of the invention, the heating plates are subdivided into a plurality of vertically stacked (or successively superimposed) heating sections and means for selectively heating the several sections. Thus, only selected portions of each heating plate may function when, for example, it is desired to preheat the wort as it is introduced into the kettle and prior to the intense heating thereof which subsequently drives off water vapor to concentrate the wort. Similarly, the heating elements of the aforementioned star-shaped array may be individually switched on to heat the wort in accordance with the particular requirements.

It will be immediately appreciated that a brewing coop or kettle constructed in accordance with my instant invention may be formed with a very large heat-exchange surface area, limited only by the number of heating plates provided, concentrated at a central zone of the kettle, thereby resulting in strong convection currents originating in the central zone and flowing toward peripheral portions of the kettle to obviate the foaming up of the wort in these peripheral zones and to insure the transfer of large quantities of concentrated heat from the heating elements to the wort. Moreover, heating elements in the form of plates may be readily cleaned and, in fact, are continuously rinsed by the convection currents of wort to obviate any encrustation of the plates.

Another feature of the present invention resides in the provision of additional heating means along the bottom of the kettle to accelerate the evaporation process, although for most purposes the plate-like heating elements described above are sufficient and need not be supplemented by such bottom heating means. The convection-current effect promoted by the central heating plates may be accentuated further by shaping the bottom of the kettle convex upwardly with an apex in the region of the centrally located heating means.

According to a more specific feature of the invention, the circulation of the wort in the brewing kettle is accelerated by imparting a relative angular displacement to the kettle and the central heating plates which then constitute mixing vanes. To this end, the heating plates may be journaled within the kettle for rotation along with their common axial distributor and/or the kettle may be journaled for rotation.

Figure 3:
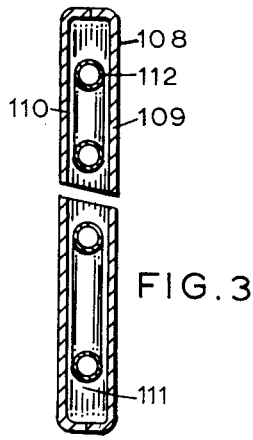
Figure 2:
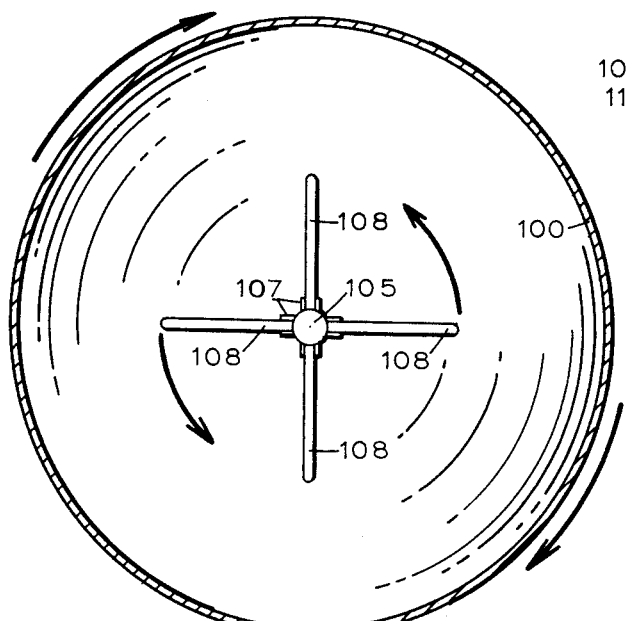
Figure 4:
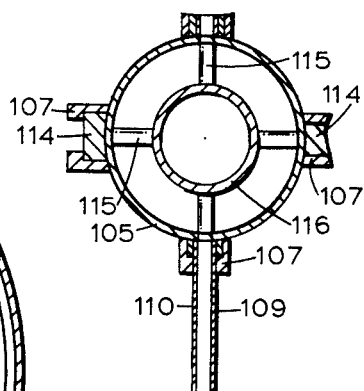
Figure 5:
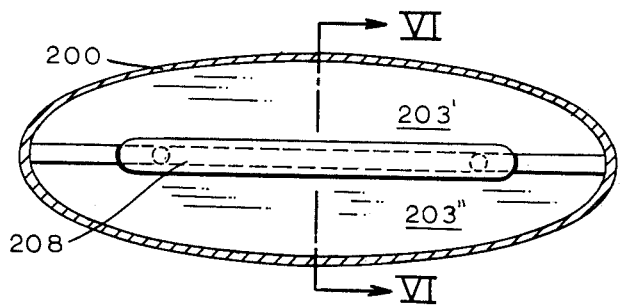
Figure 8:
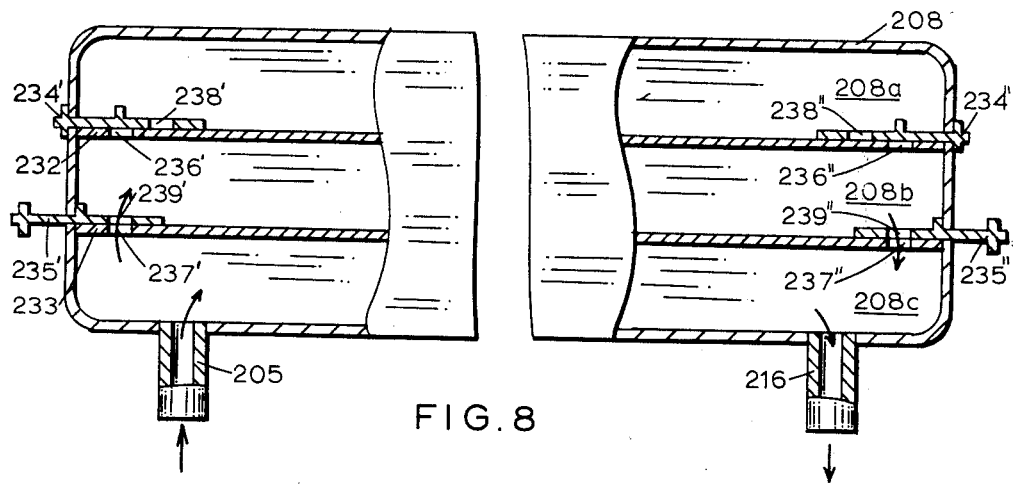
Figure 9:
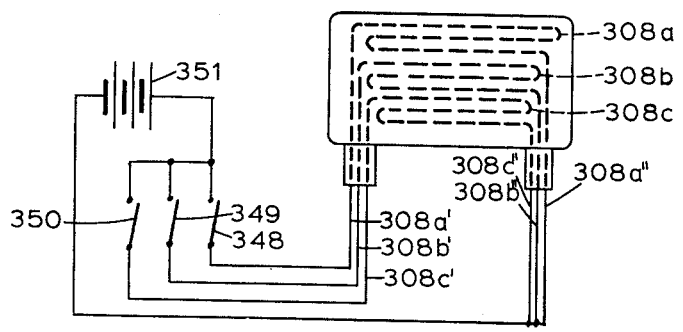
Figure 7:
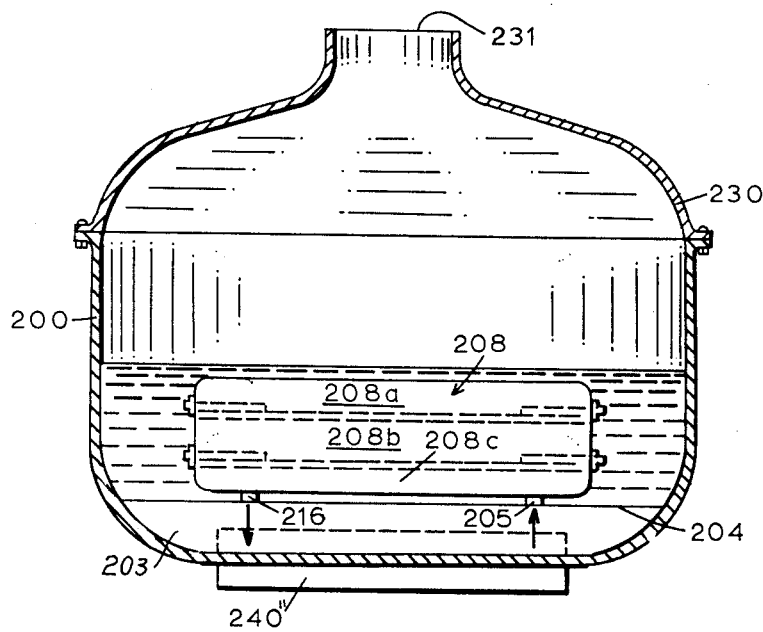
Figure 6:
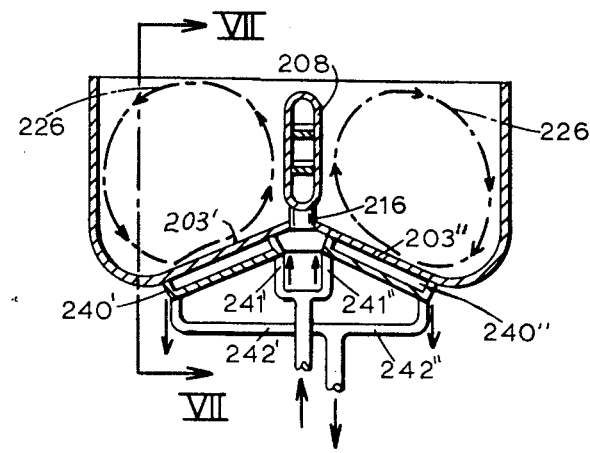

The above and other objects, features and advantages of the instant invention will become more readily apparent from the following description, reference being made to the accompanying drawing in which:

FIG. 1 is an axial cross-sectional view of a brewing kettle according to the invention;
FIG. 2 is a horizontal cross-sectional view taken along line II—II of FIG. 1;
FIG. 3 is an enlarged detail cross-sectional view taken along line III—III of FIG. 1;
FIG. 4 is a view similar to FIG. 3 taken along line IV—IV of FIG. 1;
FIG. 5 is a view similar to FIG. 2 of another concentrating kettle, according to the invention;
FIG. 6 is a cross-sectional view taken along line VI—VI of FIG. 5;
FIG. 7 is a cross-sectional view taken along line VII—VII of FIG. 6;
FIG. 8 is an enlarged elevational view, partly broken away, of the heating element of the kettle illustrated in FIGS. 5–7; and FIG. 9 is an elevational view of another heating element.

In FIGS. 1–4 of the drawing, I show a generally cylindrical brewing kettle 100 mounted upon a circular rack 101 rotatably carried by the supports 102, which are illustrated schematically. The floor or bottom 103 of this kettle 100 is belled convexly upwardly and is of generally conical configuration with its apex 104 located substantially at the axis of the cylindrical kettle. An upright heating-fluid distributor tube 105 is journaled coaxially with the kettle at a bearing 106 in the bottom 103 of the latter. The distributor tube 105 is formed with a plurality (i.e. four) of angularly spaced brackets 107 wherein the plate-like radial heating elements 108 are insertable. Each of the heating elements 108 lies in an axial plane and extends radially within the kettle 100 over a substantial fraction of its radius. Preferably, the plates 108 extend radially a distance of up to about half of the radius of the kettle.

As illustrated in FIG. 3, the heating elements 108 are each formed from two spaced-apart parallel plates 109, 110, which enclose a flattened heating chamber 111. While the heating fluid may be introduced directly into this heating chamber, in the embodiment illustrated the chamber 111 contains a zig-zag fluid-conducting tube 112 whose inlet 112' registers with a respective bore 113 in the distributing tube 105 upon insertion of the heating element 108 in its bracket 107. When less heat is desired, the element 108 may be removed from its bracket whereupon a closure member 114 (FIG. 4) may be inserted into the bracket 107 to block the corresponding apertures in the distributor tube. When a heating element 108 is mounted in its bracket 107, the outlet end of its heating-fluid tube 112 communicates with a respective nipple 115 terminating in a fluid efflux tube 116 coaxially received in the distributing tube 105 and spaced therefrom with annular clearance. This annular space is supplied with a heating fluid (e.g. steam) via a conduit 117 and a stationary jacket 118 while the efflux is conducted from the outlet tube 116 via its stationary jacket 119 and conduit 120. The plate-like heating elements 108 may be rotated (say, counterclockwise) together with their supporting and distributing tube 105 relative to the kettle 100, independently of any rotation of the latter, by a motor 123 whose spur gear 122 meshes with a gear ring 121 carried by the support tube 105. Similarly, the brawling kettle 100 may be rotated (e.g. clockwise), independently of the heating plates 108 or simultaneously with rotation of the latter, by a motor 124 whose spur gear meshes with the rack 101.

In operation, one or more heating elements 108 are inserted into their respective brackets 107 in accordance with the quantity of heat deemed sufficient to concentrate the mass of wort 125, which is introduced through the open mouth of the kettle 100. Steam is passed through the heating plates 108 from inlet conduit 117 through distributor 105, outlet tube 116 and its conduit 120 as previously described, thereby transferring at least part of the sensible heat of the steam to the wort 125 which is heated and is circulated in convention currents (schematically indicated by the dot-dash line 126) arising in the heated central region of the kettle and flowing upwardly toward the surface and thence toward the periphery of the kettle. This circulation facilitates the leaching the hops and malt which may have been introduced into the kettle simultaneously with the wort 125. Should the convection circulation be insufficient to stir the mass of wort, one or both of the motors 123, 124 are operated to rotate the heating elements 108 and/or the kettle 100, thereby further mixing the wort.

In FIGS. 5–8 I show a brewing coop 200 of generally elongated (i.e. elliptical) transverse cross-section to which is bolted a top portion 230 having a constricted mouth 231 for the introduction and discharge of a fermentative liquid to be concentrated. The kettle 200 is formed with an upwardly convex bottom 203 comprised of two upwardly sloping longitudinal bottom portions 203', 203'' merging centrally along the plane of the major axis of the ellipse. A heating element 208 in the form of an upstanding plate is supported upon the inlet and outlet tubes 205, 216 for the heating fluid traversing the heating plate 208, which extends longitudinally in the kettle 200 along the central ridge 204 of the bottom 203. The heating plate 208 is subdivided vertically into horizontally elongated heating chambers 208a, 208b and 208c by a pair of partitions 232, 233. The heating plate 208 is provided with means for selectively supplying one or more of the heating chambers with the heating fluid in accordance with the heating requirements. Such means may include, for example, suitable valves or the like in the form of slidable plates 234', 234'' and 235', 235'' co-operating with the respective partitions 232, 233 to block or unblock fluid inlet passages 236', 237' and fluid outlet passages 236'', 237''. The plates 234', 234'' and 235', 235'' are provided with respective bores 238', 238'' and 239', 239'' alignable with the respective passages 236', 236'' and 237', 237'' in the partitions in the open position of each valve plate 234', 234'' and 235', 235''. The kettle 200 also may be provided with bottom heating means, if desired, which may include a pair of heating chambers 240', 240'' having as respective walls the sloping bottom portions 203', 203''. The bottom heating chambers are supplied with the heating fluid (e.g. steam) via the conduits 241', 241'', the fluid being discharged via the conduits 242', 242''. When relatively low heat is required to concentrate the wort, the plates 234', 234'' and 235', 235'' may be displaced inwardly to block the passages 236', 236'' and 237', 237'' and close the heating chambers 208a and 208b so that a relatively small effective heat-exchange surface area is exposed to the wort. By displacing the plates 235', 235'' outwardly to align the passages 237' and 239' as well as the passages 237'' and 239'', the heating fluid is able to flow through the heating chamber 208b (as indicated in FIG. 8), thereby doubling the effective heating area. Similarly the valve members 234' and 234'' may be opened to admit the fluid to chamber 208a thereby further increasing the effective heating surface and accelerating the evaporation of water from the wort contained in the kettle 200. As indicated in FIG. 6, the wort flows in convection currents (designated by the dot-dash lines 226) from the central region of the brewing kettle of pan 200 to the outer walls thereof.

In FIG. 9, I show another form of heating plate 308, of the same configuration as the plate 208, which is provided with vertically separated electrical resistance heaters 308a, 308b and 308c whose leads 308a', 308a''; 308b', 308b''; and 308c', 308c'' are connected in series with respective switches 348, 349 and 350 and a source of electric current 351. When it is desired to preheat the wort surrounding the heating plate 308 prior to more intensive heating, the lowermost heater 308c may be energized by closing the switch 350. For more intensive heating to evaporate water from the wort, one or both of the other switches 348 and 349 may be closed to energize one or both of their respective heaters 308a and 308b. When all three heaters are energized, the wort tends to boil up in the center of the brewing vessel as previously mentioned and to flow in convection currents toward the periphery thereof.

The invention as described and illustrated is believed to admit of many modifications and variations which will be readily apparent to persons skilled in the art and which are intended to be included within the invention's spirit and scope as defined in the appended claims.

I claim:

1. A brewing vessel for the concentration of a fermentative liquid, comprising a receptacle for said liquid having lateral wall means and a bottom, at least one generally flat heating element disposed centrally in said receptacle in a substantially vertical plane and extending below the level of said liquid, while including a substantially flat vertical surface subdividing said receptacle into at least two compartments, said heating element being subdivided vertically into a plurality of heating sections and being spaced from said wall means, and control means for selectively heating said sections by passing a heating fluid through selected ones of said sections.

2. A brewing vessel for the concentration of a fermentative liquid comprising a generally horizontally elongated receptacle for said liquid having a longitudinal dimension in excess of its transverse dimension and being provided with lateral wall means and a bottom; at least one longitudinally extending flat, rectangular heating element of parallelepipedal configuration having its largest rectangular surfaces positioned on opposite sides of a vertical plane bisecting said vessel and extending parallel thereto, a long edge of said element being disposed adjacent said bottom, said heating element extending below the level of said liquid and being spaced from said wall means; and energizing means for heating said element, said bottom being of upwardly convex configuration and forming a dihedral angle converging generally toward said long edge of said element.

3. A brewing vessel for the concentration of fermentative liquid comprising a generally horizontally elongated receptacle for said liquid having a longitudinal dimension in excess of its transverse dimension and being provided with lateral wall means and a bottom, at least one longitudinally extending flat, rectangular heating element of parallelepipedal configuration having its largest rectangular surfaces positioned on opposite sides of the vertical plane longitudinally bisecting said vessel and extending parallel thereto, a long edge of said element being disposed adjacent said bottom, said heating element extending below the level of said liquid and being spaced from said wall means, and energizing means for passing a heating fluid through said element, said bottom being of upwardly convex configuration and forming a dihedral angle converging generally toward said long edge of said element, said heating element inducing a convection current of said liquid upwardly along said largest rectangular surfaces and the upwardly convex configuration of said bottom promoting the flow of said convection current upwardly along said surfaces.

References Cited by the Examiner

UNITED STATES PATENTS

| | | |
|---|---|---|
| 42,398 | 4/64 | Pond. |
| 295,695 | 3/84 | Podewils _____ 159—26 X |
| 846,187 | 3/07 | Davis. |
| 2,822,039 | 2/58 | Barbareschi _____ 159—25 |

FOREIGN PATENTS 12,096 1901 Great Britain.

NORMAN YUDKOFF, *Primary Examiner.*

BENJAMIN BENDETT, *Examiner.*